Figure 1:
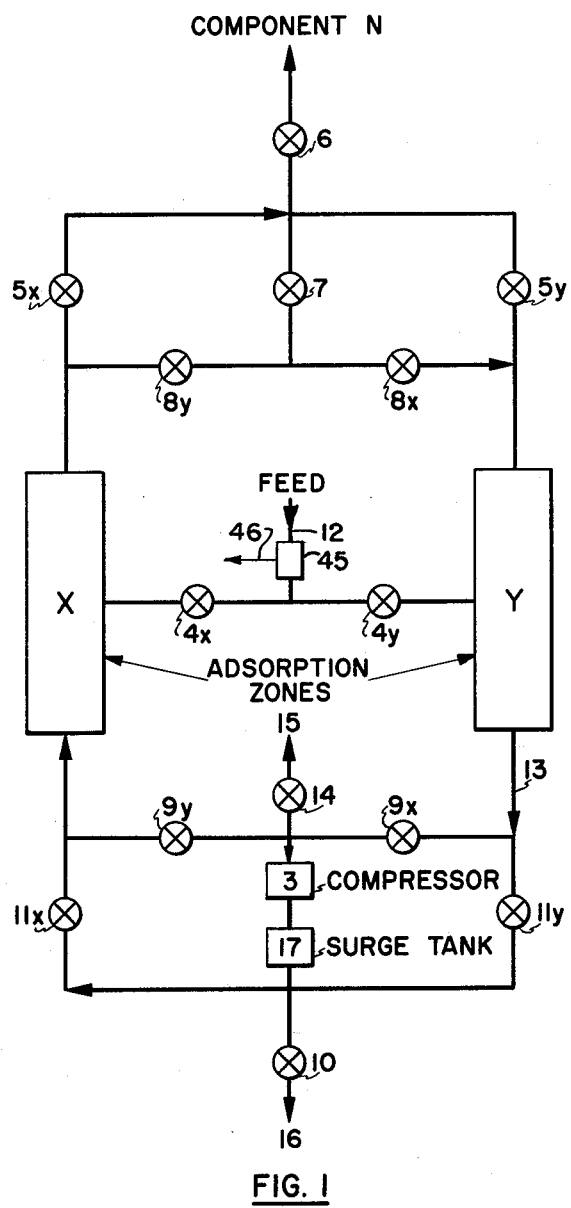

Sept. 22, 1964     H. Z. MARTIN     3,149,934
CYCLIC ADSORPTION PROCESS

Filed July 13, 1961     2 Sheets-Sheet 1

Homer Z. Martin     Inventor

By Richard W. Nagel

Patent Attorney

Homer Z. Martin   Inventor
By Richard N. Nagel
Patent Attorney

United States Patent Office 3,149,934
Patented Sept. 22, 1964

3,149,934
CYCLIC ADSORPTION PROCESS
Homer Z. Martin, Westfield, N.J., assignor to Esso Research and Engineering Company, a corporation of Delaware
Filed July 13, 1961, Ser. No. 123,798
11 Claims. (Cl. 55—58)

This invention relates to a new and improved process for fractionating mixtures.

More specifically, this invention is directed towards an improvement in the method for fractionating gaseous mixtures taught in U.S. Patent 2,944,627, issued to Charles W. Skarstrom on July 12, 1960.

Briefly, the aforementioned patent, the disclosure of which is hereby incorporated herein, is concerned with an adsorption process wherein a so-called "key component" is separated from a gaseous mixture. The adsorption is carried out at a relatively high pressure and is followed by a desorption step at relatively low pressure. By rapidly shifting from adsorption to desorption, the adsorbent is prevented from coming to equilibrium with the key component in the gaseous material. The rapid cycles permit the processing of large quantities of material and, furthermore, result in an oscillating concentration gradient within the adsorbent bed.

In order to reduce the partial pressure of the adsorbed key component during the desorption step of the cycle, a portion of the pure product, i.e., primary effluent or unadsorbed component, from the adsorption zone is recycled or refluxed to the zone at the relatively low pressure. A more complete disclosure of this and other modifications is set forth in U.S. Patent 2,944,627.

As advantageous as the above process is, certain undesirable features were noted. Specifically, it was found that in some cases a large portion of the unadsorbed component was lost; and, when this component was of value, the process became less economically attractive or entirely uneconomical.

In carrying out the adsorption process, wherein reflux with a portion of the unadsorbed component was employed, a desorbate or secondary effluent containing both adsorbed and unadsorbed components is obtained. This desorbate is conventionally vented to the atmosphere or to other disposition than that of the purified unadsorbed product. Such procedure results in the loss of a considerable amount of the unadsorbed component.

Furthermore, where it is desirable to obtain a stream containing a high purity of the adsorbed component, the prior process may often be deficient. Though the desorbate has a higher concentration of the adsorbed material than the feed, it was diluted with large amounts of the unadsorbed reflux material.

In accordance with the instant invention, it has been found that by compressing the desorbate and recycling at least a portion thereof to the bottom of the bed, undergoing or about to undergo adsorption, and, by introducing the feed into said adsorption zone at an intermediate point, loss of the unadsorbed component may be greatly reduced or substantially eliminated. The intermediate point in the adsorption zone at which the feed is introduced should be selected so that the concentration of the gas stream passing through the bed at that point is approximately the same as the feed. In other words, the feed should be introduced into the adsorption zone at an equilibrium point. However, since this equilibrium point moves through the bed as the adsorption continues, its position cannot be definitely defined. As a result, it is desirable to introduce the feed at a point which represents the average equilibrium point.

In many operations, the desorbate stream may be of varying composition. Since it is advantageous to have a constant composition feed mixture, it is desirable to pass the secondary effluent into a surge tank prior to its recycle. The surge tank serves to "average out" the recycled composition. It may be located either before or after the compressor.

Another advantageous technique which may be employed with or without the surge tank is that of venting to the atmosphere the secondary effluent which is obtained at the beginning of the desorption cycle. This initial secondary effluent has a comparatively low amount of the nonadsorbed component and hence it need not be recompressed and recycled with the later portions of the secondary effluent. The determination of when to start to recycle the secondary effluent is dependent on well known engineering considerations such as, for example, the amount of nonadsorbed component appearing and the economic value of such material.

In order to further illustrate the instant invention, attention is directed to the attached figure. This figure shows diagrammatically one mode of practicing the invention.

In describing the illustration, a two-component system consisting of components A and N, i.e., the adsorbed and nonadsorbed component, will be referred to. It should be understood that multicomponent systems may be processed in accordance with this invention and, furthermore, that the terms "adsorbed" and "nonadsorbed" are used in a relative sense and should be more correctly referred to as the "more readily adsorbed" and the "less readily adsorbed" components. The apparatus illustrated consists of two zones, X and Y, which contain an adsorbent advantageous for the desired separation. The valves indicated by the letters $x$ are opened when zone X is undergoing adsorption and zone Y desorption, while the valves lettered $y$ are closed. Conversely, when zone Y is undergoing adsorption and zone X is being desorbed, the valves lettered $y$ are opened and the valves lettered $x$ are closed. Naturally, many variations of these valving arrangements may be utilized and would be obvious to one skilled in the art.

Initially, feed is introduced at a relatively high pressure through line 12 and passes through line 4$x$ into adsorption zone X at a point intermediate to the ends thereof. Prior to introduction of the feed into the adsorption zone, the feed may be passed into a guard chamber (not shown). This chamber may serve to remove materials which will interfere with the main adsorption process. In the adsorption zone, the A component is adsorbed and a stream consisting essentially of the N component passes through valve 5$x$. This stream is referred to as the primary effluent. By using a pressure reducing means 7, a portion of the stream is reduced to a relatively low pressure and passed through valve 8$x$ into adsorption zone Y undergoing desorption. The pressure reducing means 7 may be, for example, a valve or an orifice. By regulating valves 6 and 7, a portion of the primary effluent is recovered, while another portion as mentioned is used for the desorption. For example, half the total volume of primary effluent may be recovered, while the other half, after expansion in means 7, used for desorption. Desorption zone Y, maintained at a relatively low pressure, has a relatively high concentration of component A at the beginning of the desorption cycle. As desorption continues, the concentration of the A component is reduced and a stream containing both A and N is recovered through line 13. According to the prior art, the material leaving line 13 is removed from the process. However, in the present invention, this stream is passed through valve 9$x$ and at least a part thereof is passed to compressor 3, wherein its pressure is increased from the relatively low pressure of zone Y to the relatively high pressure of zone X. A portion of this material, if desirable, may be vented to the atmosphere or recovered through line 15 by making appropriate adjustment of valve 14. The compressed material, richer in component A than the feed stream, is passed to a surge tank 17. The surge tank serves to average out the desorbate composition. A portion of compressed desorbate in surge tank 17 is recycled through valve 11x to the bottom of the adsorption zone X, wherein the A component is again adsorbed. The introduction of feed is determined in such a manner that it enters the adsorption zone at a point wherein the time average concentration gradient is approximately the same as the feed. Prior to saturation of adsorption zone X, the valves in the apparatus are adjusted so as to discontinue the adsorption in zone X and to commence adsorption in zone Y. This is accomplished by opening the y valves and closing the x valves by any appropriate means such as by the use of a cycle timer connected to activate solenoids which open and close the valves.

Many modifications of the instant invention are contemplated. For example, if it is desirable to remove a portion of the secondary effluent, i.e., the desorbate, at a high pressure, it may be removed from this system via line 16, rather than line 15. Furthermore, if the component A can be readily condensed in relation to component N, it would be desirable to incorporate cooling apparatus either prior to or after the compressor 3, and remove a highly concentrated stream of the A component by condensation.

Additionally, various heat exchangers in different parts of the process may be incorporated to give the process a higher overall efficiency. Specifically, by heat exchanging the stream from the compression of the secondary effluent with the expanded portion of the primary effluent, energy may be more effectively utilized. This exchange would serve to increase the heat in the reflux stream, thereby aiding desorption, and cool the compressed secondary effluent, thereby increasing the effectiveness of the subsequent adsorption. The particular types of heat exchangers are well known to those skilled in the art. Or, alternatively, the energy of expansion of the primary effluent may be used to perform mechanical work, as for example, running the compressor.

Figure 2:
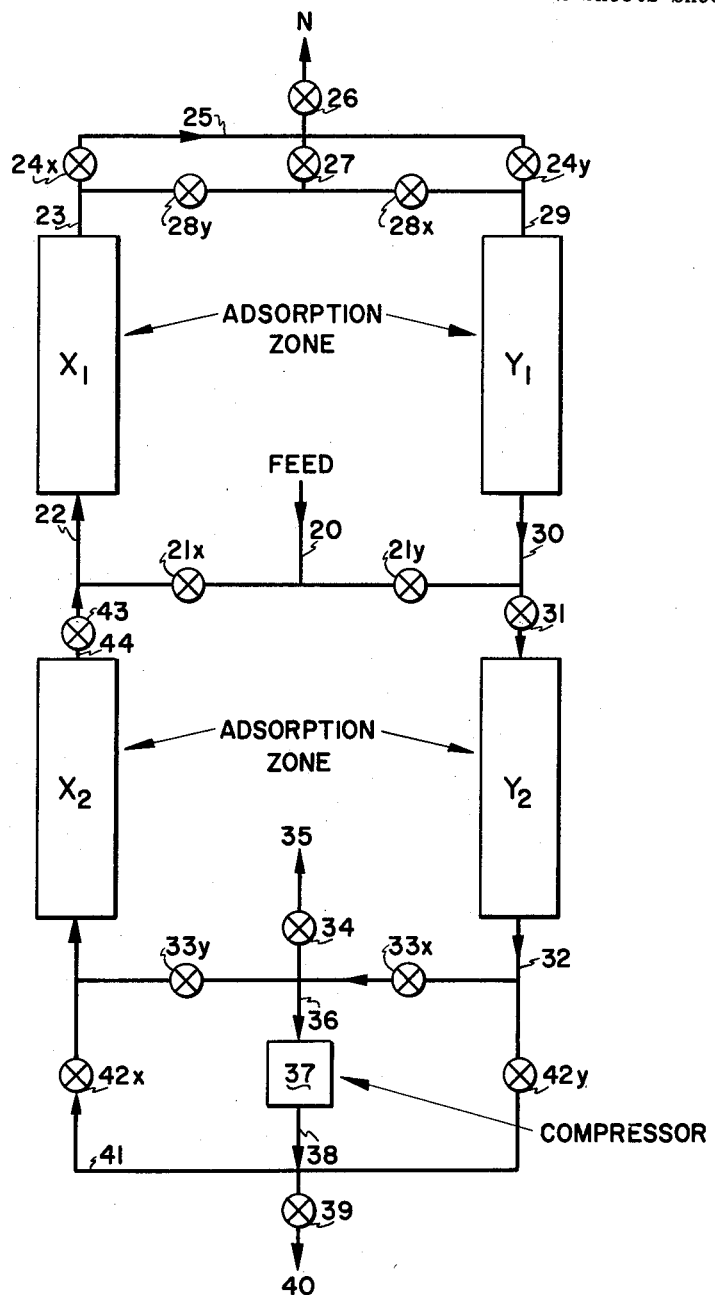

FIGURE 2 shows a modification of the instant invention wherein two zones are connected in series, both for adsorption and desorption. In this modification, the feed is introduced at a point between the two adsorption zones. As described for the previous figure, while the X zones are undergoing adsorption and the Y zones desorption, the x valves are closed. The reverse situation occurs when the Y zones are on adsorption and the X zones on desorption. Initially, feed is introduced through line 20 and passes through valves 21x and line 22 into the upper adsorption zone X1. The feed is introduced at a relatively high pressure. At the beginning of the operation, valve 43 is closed since no material is passing through zone X2. A stream containing a high concentration of the N component leaves zone X1 through line 23, passes through valve 24x and line 25. This stream is referred to as the primary effluent or adsorbate. At this point, a predetermined portion of the material is removed from the process through valve 26. At least a portion of the effluent from tower X1 is reduced in pressure as it passes through valve 27 and valve 28x and line 29, and passed into the top of zone Y1. The desorption takes place at a relatively low pressure. It is presupposed herein that zones Y1 and Y2 had been saturated with the A component from a previous adsorption step. The material free of the A component to a relatively low pressure serves to reduce the partial pressure of A, the adsorbed component, in zone Y1. Similarly, this material exits from zone Y1 through line 30, passes through valve 31 into zone Y2, wherein the latter zone is also desorbed. While for simplicity of operation it might be desirable to maintain zones Y1 and Y2 at the same pressure, it is also within the scope of this invention to use different relatively low pressures in the two zones. For example, it might be desirable to further reduce the pressure in zone Y2 since the purging material is no longer completely free from the adsorbed component. A secondary effluent is withdrawn through line 32 and passes through valve 33x. A portion may be removed through valve 35x and 35 at this point in the process. However, at least a portion of the secondary effluent is passed to compressor 37 via line 36. Compressor 37 increases the pressure of the secondary effluent from the relatively low desorption pressure to the relatively high adsorption pressure. The secondary effluent at line 38 may again be segregated if desirable and a portion removed from the process through valve 39 and line 40. This compressed stream contains a higher partial pressure of A than exists in the feed. At least a portion of the high pressure material is recycled via line 41 and valve 42x into the lower portion of adsorption zone X2. In this zone, the A component is adsorbed along the concentration gradient and a stream containing a concentration of components substantially the same as or greater than the primary feed is withdrawn through line 44. At this time, valve 43 is open and the material flows through line 22 into the lower portion of the adsorption zone X1. Once the cycle has been under way, valve 43 remains open and the lower portion of zone X1 is continuously fed with material from line 44 and fed during the adsorption process. While for simplicity of operation zones X1 and X2 are maintained at the same relatively high pressure, it is within the scope of this invention that the pressures in these zones be unequal. Furthermore, it is within the scope of the invention to use different adsorbents in the X1 and Y1 zones than in the X2 and Y2 zones. Such a procedure might be advantageous since the two zones are adsorbing materials present in different concentrations. During desorption, the partial pressure of A in the gas in contact with the solid is equal to or less than that corresponding to equilibrium with the adsorbed phase. This latter is limited to the partial pressure in the gas phase in contact with the adsorbent during the adsorptive operation. Thus, in the previous art, the greatest partial pressure of A in the desorption gas equals that in the feed. By virtue of the lower total pressure in the desorption operation, however, the concentration (expressed for example as mole fractions) of A in the desorption gas is greater than that in the feed gas. By compressing the desorption gas, then, to the pressure used in the adsorption step, a gas is produced which has a greater partial pressure of A than that in the feed. This, then, is a suitable gas to be recycled to the bottom of the adsorber, below the point of fresh feed introduction for the purpose of increasing the recovery of N in the effluent from the top of the adsorber. At the same time, the concentration of A on the adsorption solids at the bottom of the adsorber is increased and, as a result, the concentration of A in the desorber gas is clearly greater in the effluent when the present invention is practiced than in the prior art systems, which had no recycle system as herein described. Clearly then, this invention results in increased recovery of A and higher concentrations of A and N in overhead and desorbed streams, respectively.

The use of the instant invention is desirable in many types of separations, for example, in the recovery of hydrogen from hydrocarbon components, such as is common in many refinery streams, specifically Powerformer tail gas. In addition, the process is invaluable in drying hydrogen and various other gases. Furthermore, the recovery of $C_2$ or $C_2$ and $C_3$'s from natural gas is a contemplated process. Of course, there are many other separations wherein the instant modifications are advantageous. Specifically, these are in separations where the nonadsorbed component is valuable and it would be uneconomical to discard it or remove it from the process in other than a high state of purity.

In the separation of hydrogen from the Powerformer tail gas, it is often desirable to use a guard chamber for the removal of the higher molecular weight hydrocarbons. If these latter hydrocarbons ($C_6+$) enter the adsorption zone, they rapidly contaminate the bed, lowering its capacity for the lower molecular weight hydrocarbons, e.g., methane. The problem of desorbing these highly tenacious heavy hydrocarbons from the adsorbent has been partially solved by desorbing the adsorption zone under vacuum. However, if a guard chamber is employed, the heavy hydrocarbons are prevented from entering the adsorption zone, and therefore the latter zone need not be subject to vacuum desorption. The heavy hydrocarbons may be removed from the guard chamber by vacuum desorption; but, since this chamber is considerably smaller than the adsorption zone, much smaller vacuum facilities are required.

In addition to the above treatment, the guard chamber may be independently treated in other manners, for example, it may be desirable to steam the guard chamber only or to treat the guard in a different time cycle from that of the main adsorptive bed. Also, the guard chamber could contain different adsorbent material. Furthermore, the feed material may be allowed to pass therethrough at a different velocity. In other modifications, the guard can be in a separate vessel from the main adsorbent or so arranged that the depressuring gas from the main vessel bypasses the guard while permitting the purge gas to go through, that is, the guard chamber is depressured separately so that it is possible to have a higher velocity during the onstream time than in the main adsorber.

A typical guard bed is shown in feed line 12 as item 45 of FIGURE 1. Line 46 can be used to clean up the guard bed by connecting it to a source of vacuum or it can be used as an exit line if purge with an inert gas or part of the depressure gas is used.

Another modification of the instant invention can be incorporated to increase the concentration of the adsorbed component in the desorbate. At the end of the adsorption step, after the introduction of feed has been discontinued, it is desirable to flush the adsorption zone with the recycled, compressed desorbate. This procedure removes void gas from the adsorption zone and replaces it with the desorbate. By "void gas" is meant that gas which accumulates in the voids between the adsorbent particles during adsorption. This void gas, which has approximately the same composition as the feed, is leaner in the adsorbed components than the desorbate. Hence, when the adsorption zone is subsequently desorbed, the voids are occupied by a material having a higher concentration of adsorbable components. This results in a higher purity desorbate.

The types of adsorbents which should be used are well known to those skilled in the art. For example, if it is desirable to separate hydrogen from light hydrocarbons, activated char would be used. On the other hand, in drying processes, silica gel would be advantageous. It is well known in the art which adsorbents function preferably in particular separations, and such teachings could be readily incorporated along with the inventive features herein disclosed. The various conditions maintained in the operation may also readily be selected by one skilled in the art. For example, the amount of reflux desired and the temperatures and relative pressures of the operation are discussed at length in U.S. Patent 2,944,627.

*Example 1*

Using the equipment described in FIGURE 1, a calculated process can be described as follows. A 50/50 hydrogen-methane mixture is subjected to adsorption at 500 p.s.i.a. at 70° F. The desorption may be carried out at 15 p.s.i.a. and essentially the same temperature. The adsorbent employed may be about 560 pounds of activated charcoal in each adsorber. The adsorption-desorption time is about three minutes on each step. The feed rate is about 15,000 s.c.f.h. According to calculation, an essentially pure hydrogen secondary effluent is recovered. When the reflux to feed ratio is 0.5, the hydrogen loss was only 25%. Comparative calculations show that where no reflux is employed a 50% hydrogen loss occurred. This clearly shows the improved recovery obtained by using the recycling technique of the instant invention.

While the instant invention is preferably directed towards an improvement in the process and apparatus taught in U.S. Patent No. 2,944,627, it need not be so limited. For example, in the aforementioned patent, rapid cycling is employed which results in the discontinuance of adsorption prior to saturation of the adsorbent. In addition, the rapid cycling limits the delta T and thereby prevents the loss of heat by flow through the adsorption bed walls. However, the improvement of the instant invention would be effective even if the above limitations on adsorption and cycle time were not adhered to. If for certain technical reasons it is found desirable to conduct adsorption until saturation, or to lengthen the cycle time, the inventive concept could still be employed.

The only essential limitations on the adsorption process are, firstly, that adsorption take place at a pressure greater than desorption and, secondly, that the primary or nonadsorbed effluent from the adsorption zone be refluxed to the zone undergoing desorption.

The above description is only for the purpose of illustrating the invention and is not intended to be definitive thereof.

What is claimed is:

1. In a cyclic adsorption-desorption process wherein the adsorption zone is maintained at a pressure greater than the desorption zone and wherein at least part of the primary effluent is refluxed to the desorption zone, the improvement which comprises: compressing at least a portion of the secondary effluent from said desorption zone, recycling said compressed secondary effluent to the bottom of said adsorption zone, and introducing feed into the adsorption zone at a point intermediate the ends of the adsorption zone and wherein said primary effluent contains substantially nonadsorbable components and said secondary effluent contains a high concentration of adsorbable components relative to said feed.

2. A method for separating a gaseous feed containing components A and N which comprises: (1) simultaneously introducing said feed and a secondary effluent hereinafter specified into an adsorption zone containing an adsorbent selective of said A component, said feed being introduced at an intermediate point and said secondary effluent being introduced at the bottom of said adsorption zone; (2) selectively adsorbing said A component; (3) withdrawing a primary effluent from said zone containing substantially component N; (4) desorbing said A component by maintaining said adsorption zone at a relatively low pressure by introducing at least a portion of said primary effluent; (5) withdrawing from said adsorption zone a secondary effluent having a high concentration of A component relative to said feed; (6) compressing at least a portion of said secondary effluent; and (7) recycling at least a portion of said compressed secondary effluent to the bottom of said adsorption zone as previously described.

3. In the process of claim 2 wherein the introduction of said feed and said secondary effluent to said adsorption zone is discontinued prior to the saturation of said adsorbent with the A component.

4. In the process of claim 2 wherein the initial portion of said secondary effluent is removed from the process and wherein the remaining portion is recycled as described.

5. In the process of claim 2 wherein said intermediate point of said adsorption zone has a concentration of components approximately the same as the feed.

6. A method for separating a gaseous feed containing components A and N wherein there are at least two pair of adsorbent beds alternately undergoing adsorption and desorption, said beds on adsorption being at a relatively high pressure and said beds on desorption being at relatively low pressure, which comprises: introducing said feed and the effluent from the first zone on adsorption into the second zone on adsorption in a positive flow direction, adsorbing said A component, withdrawing a primary effluent from said second zone on adsorption substantially free of said A component, recycling at least a portion of said primary effluent to desorb the second of said zones on desorption in a reverse flow direction, withdrawing an effluent from said second zone on desorption and introducing said effluent in a reverse flow direction into the first zone on desorption thereby desorbing said second and first zones on desorption, withdrawing a secondary effluent rich in said A component from said first zone on desorption, recompressing at least a portion of said secondary effluent, introducing said compressed secondary effluent in a positive flow direction into said first zone on adsorption, adsorbing at least part of said A component, withdrawing an effluent from said first zone on adsorption depleted in said A component, introducing said effluent along with the feed into said second zone on adsorption as previously described, discontinuing said positive flow to said zones on adsorption prior to saturation of said second zone on adsorption with the A component and discontinuing said reverse flow through said zones on desorption prior to complete desorption of said A component, and thereafter alternately placing said pair of zones undergoing desorption on adsorption and said pair of zones undergoing adsorption on desorption.

7. The method of claim 6 wherein said effluent from said first zone on adsorption is of approximately the same composition as said feed.

8. A process according to claim 1 wherein said feed is subjected to a preliminary adsorptive separation in a guard chamber prior to being introduced into said adsorption zone.

9. The process of claim 8 wherein said guard chamber is regenerated at a pressure less than the pressure in said desorption zone.

10. The process of claim 8 wherein said guard chamber is regenerated by steam stripping.

11. The process of claim 8 wherein the flow rate through said guard chamber is different from said adsorption zone.

References Cited in the file of this patent
UNITED STATES PATENTS

| | | |
|---|---|---|
| 2,614,657 | Nicholson et al. | Oct. 21, 1952 |
| 2,747,681 | Schuftan et al. | May 29, 1956 |
| 2,823,764 | Miller | Feb. 18, 1958 |
| 2,944,627 | Skarstrom | July 12, 1960 |
| 2,988,502 | Ricards et al. | June 13, 1961 |
| 3,102,013 | Skarstrom | Aug. 27, 1963 |